UNITED STATES PATENT OFFICE.

JAMES H. PITT, OF BELLAIRE, OHIO.

IMPROVEMENT IN LUBRICATING COMPOUNDS.

Specification forming part of Letters Patent No. 193,280, dated July 17, 1877; application filed April 12, 1877.

*To all whom it may concern:*

Be it known that I, JAMES H. PITT, of Bellaire, in the county of Belmont and State of Ohio, have invented a new and useful Compound, called Car, Mill, and Axle Grease, which compound is fully described in the following specification:

This invention relates to that class of compounds used to lubricate cars, mill machinery, and axles; and it consists in a composition formed by mixing residuum or petroleum-tar, animal grease, rosin, salt, and lye dissolved in water.

To prepare the car, mill, and axle grease, I use one barrel of residuum or petroleum, fifty pounds of animal grease, sixty pounds of rosin, ten quarts of lye, and five pounds of salt dissolved in water.

All of the above-mentioned ingredients, with the exception of the lye, are mixed together and heated to 250° Fahrenheit. The lye is then added cold, and stirred well into the mixture, and in twenty-four hours is ready for use. This compound, when applied to use, effectually resists the action of water upon the working surfaces of machinery, when exposed to water or moisture.

I am aware of the patent granted to Samuel Y. Love, under date of September 30, 1873, and do not desire to claim, separately or collectively, the ingredients described therein; but What I do claim as new, useful, and constituting an improved lubricating compound, is—

The within-described lubricating compound, consisting of crude petroleum, animal grease, rosin, lye, and salt, in or about the proportions substantially as described.

JAMES H. PITT.

Witnesses:
B. REIN,
L. H. HALL.